United States Patent
Grumm et al.

(10) Patent No.: US 11,299,214 B2
(45) Date of Patent: Apr. 12, 2022

(54) CLOSED STRUCTURAL COMPONENT AND PROCESS FOR PREPARING THE SAME

(71) Applicant: BASF SE, Ludwigshafen am Rhein (DE)

(72) Inventors: Kipp Grumm, Wyandotte, MI (US); Prasanna S. Kondapalli, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 262 days.

(21) Appl. No.: 16/633,000

(22) PCT Filed: Aug. 17, 2018

(86) PCT No.: PCT/EP2018/072289
§ 371 (c)(1),
(2) Date: Jan. 22, 2020

(87) PCT Pub. No.: WO2019/034761
PCT Pub. Date: Feb. 21, 2019

(65) Prior Publication Data
US 2020/0207425 A1 Jul. 2, 2020

Related U.S. Application Data

(60) Provisional application No. 62/547,189, filed on Aug. 18, 2017.

(30) Foreign Application Priority Data

Sep. 26, 2017 (EP) .................................. 17193153

(51) Int. Cl.
*B60J 9/00* (2006.01)
*B62D 29/04* (2006.01)
(Continued)

(52) U.S. Cl.
CPC ............. *B62D 29/04* (2013.01); *B62D 25/00* (2013.01); *B29L 2031/3044* (2013.01)

(58) Field of Classification Search
CPC ....... H01L 2924/00; H01L 2924/01006; H01L 2924/01033; B29C 70/865; A61P 43/00;
(Continued)

(56) References Cited

U.S. PATENT DOCUMENTS 3,640,798 A * 2/1972 Deeds .................... E04C 2/32
428/117
3,849,237 A * 11/1974 Zetlin .................... E04C 2/34
428/116
(Continued)

FOREIGN PATENT DOCUMENTS

DE 10 2006 032 867 A1 1/2008
DE 10 2011 100 050 A1 10/2012
(Continued)

OTHER PUBLICATIONS

Extended European Search Report dated Mar. 23, 2018 in corresponding European Patent Application No. 17193153.8, 3 pages.
(Continued)

*Primary Examiner* — Kiran B Patel
(74) *Attorney, Agent, or Firm* — Grüneberg and Myers PLLC (57) ABSTRACT

The present invention is directed to a closed structural component and process for preparing the same.

4 Claims, 4 Drawing Sheets

(51) Int. Cl.
*B62D 25/00* (2006.01)
*B29L 31/30* (2006.01)

(58) Field of Classification Search
CPC .......... A61P 35/00; A61P 25/00; F16C 3/026; Y10S 428/902
See application file for complete search history.

(56) References Cited

U.S. PATENT DOCUMENTS

| | | | | |
|---|---|---|---|---|
| 3,995,081 | A * | 11/1976 | Fant | B29D 24/001 |
| | | | | 428/119 |
| 4,051,289 | A * | 9/1977 | Adamson | B29C 70/08 |
| | | | | 428/113 |
| 4,125,977 | A * | 11/1978 | Michlovic | E04B 5/10 |
| | | | | 52/220.4 |
| 4,272,578 | A * | 6/1981 | Schegerin | A63C 5/12 |
| | | | | 428/113 |
| 4,965,138 | A * | 10/1990 | Gonzalez | B62D 25/2054 |
| | | | | 428/593 |
| 8,047,603 | B2 * | 11/2011 | Goral | B62D 29/005 |
| | | | | 296/187.03 |
| 8,118,351 | B2 * | 2/2012 | Gonin | B62D 25/084 |
| | | | | 296/193.09 |
| 8,267,446 | B2 * | 9/2012 | Gonin | B60R 19/12 |
| | | | | 293/136 |
| 2006/0181089 | A1 * | 8/2006 | Andre | B62D 29/004 |
| | | | | 293/120 |
| 2008/0014388 | A1 | 1/2008 | Mett et al. | |
| 2008/0217960 | A1 * | 9/2008 | Kochert | C25D 13/14 |
| | | | | 296/193.06 |
| 2010/0117397 | A1 * | 5/2010 | Richardson | B29C 65/4855 |
| | | | | 296/187.02 |
| 2011/0104413 | A1 | 5/2011 | Mendibourne et al. | |
| 2011/0254295 | A1 * | 10/2011 | Cave | B29C 66/7212 |
| | | | | 293/132 |
| 2013/0234472 | A1 | 9/2013 | Diaz Sanchez et al. | |
| 2013/0313862 | A1 | 11/2013 | Yamaji et al. | |
| 2014/0203592 | A1 * | 7/2014 | Nagwanshi | B62D 29/001 |
| | | | | 296/187.01 |
| 2018/0022397 | A1 * | 1/2018 | Richardson | B29C 69/02 |
| | | | | 296/187.03 |
| 2018/0079454 | A1 * | 3/2018 | Kellner | H02G 3/0437 |
| 2021/0086839 | A1 * | 3/2021 | Zhang | B62D 29/04 |

FOREIGN PATENT DOCUMENTS

| | | |
|---|---|---|
| EP | 2 636 578 A2 | 9/2013 |
| EP | 2 671 779 A1 | 12/2013 |
| WO | WO 2007/082677 A1 | 7/2007 |

OTHER PUBLICATIONS

International Preliminary Report on Patentability and Written Opinion dated Feb. 18, 2020 in PCT/EP2018/072289 (English Translation only), 9 pages.
International Search Report dated Nov. 15, 2018 in PCT/EP2018/072289 filed on Aug. 17, 2018.

* cited by examiner

CLOSED STRUCTURAL COMPONENT AND PROCESS FOR PREPARING THE SAME

FIELD OF THE INVENTION

The present invention is directed to a closed structural component and process for preparing the same.

BACKGROUND OF THE INVENTION

Structural components find wide application as reinforcement materials in the automobile industry. A typical motor vehicle is assembled by aligning and fastening numerous components such as a roof cross member, cross beam, front end, floor, pillars, roof frame, seat and many more. For many years, the automobile industry has endeavored to provide vehicle structures that are capable of absorbing or deflecting shocks or stresses on the passenger cell. For this, structures are employed, for example, that reinforce or stiffen the frame surrounding the passenger cell by means of structural components.

US 2008/0217960 A1 describes one such support that possesses flow channels in the direction of its longitudinal axis. The support additionally possesses external surfaces that are offset to each other in the direction of the longitudinal axis as well as a lateral external surface. These external surfaces are provided with a layer of a thermally expansible and curable composition. Reinforcing components of this type are suitable for stiffening and/or reinforcing hollow supports, such as the A-, B- or C-pillars, the roof edges or the rocker panels of vehicles, especially passenger cars.

U.S. Pat. No. 8,047,603 B2 discloses a plastic crush countermeasure for motor vehicles that includes a plastic insert and a reinforcement structure that provides impact and/or reinforcement characteristics and an attachment interface to the vehicle in a lighter weight structure. The crush countermeasure provides a lightweight crush system that provides comparable protection to current metal crush countermeasures using, in part, a plastic material. As such, the overall weight of a vehicle is reduced without any reduction in safety to passengers.

Another US 2006/0181089 A1 describes an impact beam comprising a metal crosspiece and reinforcement ribs made of a plastic material and overmolded onto the metal crosspiece.

WO 2007/082677 A1 describes hollow profiles which are reinforced with ribbed structures in which the ribs run perpendicular to the axis of the hollow profile and the ends of the ribs are provided with heat activatable adhesive material which may be expandable activated to bond the ends of the ribs to the inner surface of the hollow profile.

EP 2 636 578 A2 describes an injection molded structural component with a hollow structural section, said hollow structural section comprising a section body having a cavity with an opening, a section lid secured to said section body via a hinge-folded onto said opening and a means fastening the section lid to the section body such that the hollow structural section withstands dynamical load.

The prior art structural components have several limitations. These components are unable to withstand buckling due to high load and stress, thereby reducing the buckling load. Moreover, it is also desirable to provide a structural component which, being light in weight, is capable of withstanding or deflecting the torsion, bending and crushing due to sudden impact or increase in load. Further, a structural component which is easily manufactured and used without any additional processing steps is a challenge to obtain.

Also, the existence of an adhesive or a fastening means within the component results in loss of structural area which further results in lesser reinforcement and reduced load bearing capability.

Thus, it was an objective of the presently claimed invention to provide a structural component which is light in weight, is capable of withstanding buckling due to high load and stress, is capable of withstanding or deflecting the torsion, bending and crushing due to sudden impact or increase in load and does not requires an adhesive ora fastening means. It was another objective of the present invention to obtain a structural component which can be easily manufactured and used without any additional processing steps in an automotive industry as an insert or for home and decorative purposes as an insert in furniture.

SUMMARY OF THE INVENTION

It has been found that a closed structural component (300) comprising an elongated base composite (100) comprising a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal (102) and dispersed on the bottom (104), and a flat top (200) disposed onto the edge (103) of the first and the second longitudinal walls (101, 102) of the elongated base composite (100), wherein a flat top (200) is integrally molded to an elongated based composite (100) is capable of withstanding buckling due to high load and stress, is capable of withstanding or deflecting the torsion, bending and crushing due to sudden impact or increase in load, is easier to manufacture and use without any additional processing steps and is completely reinforced without any loss in load bearing capability for application in areas such as, but not limited to, an automotive industry as an insert or for home and decorative purposes as an insert in furniture.

Accordingly, in one aspect, the presently claimed invention is directed to a closed structural component (300) comprising:

an elongated base composite (100) comprising a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), and a flat top (200) disposed on the edge (103) of each of the first and the second longitudinal walls (101, 102) of the elongated base composite (100).

In another aspect, the presently claimed invention is directed to a closed structural component (300) comprising:

an elongated base composite (100) comprising a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), and a flat top (200) disposed on the edge (103) of each of the first and the second longitudinal walls (101, 102) of the elongated base composite (100), wherein the flat top (200) is integrally molded to the elongated base composite (100).

In another aspect, the presently claimed invention is directed to a process for preparing a closed structural component (300) comprising the steps of:

(A) thermoforming at least one thermoplastic composite material to obtain an elongated base composite (100) comprising a first longitudinal wall (101), a second longitudinal wall (102) and a bottom (104), wherein the first and the second longitudinal walls (101, 102) are placed opposite to one another and disposed on the bottom (104), and wherein a flat top (200) is disposed on the edge (103) of the first longitudinal wall at an angle theta (θ) which is in the range of greater or equal to 0 degrees to lower or equal to 90 degrees, (B) injection molding the elongated base composite (100) obtained in step (A) with the at least one thermoplastic composite material to obtain a plurality of reinforcement ribs (105) connected at each end to each of the first longitudinal wall (101) and the second longitudinal wall (102) and dispersed on the bottom (104) in the elongated base composite (100), (C) pressing the flat top (200) onto the edge (103) of the second longitudinal wall (102) of the elongated base composite (100) of step (B) to obtain a closed structural component (300).

In another aspect, the presently claimed invention is directed to a process for preparing a closed structural component (300), comprising the steps of:

(A) thermoforming at least one thermoplastic composite material to obtain an elongated base composite (100) comprising a first longitudinal wall (101), a second longitudinal wall (102) and a bottom (104), wherein the first and the second longitudinal walls (101, 102) are placed opposite to one another and disposed on the bottom (104), wherein a flat top (200) is disposed on the edge (103) of the first longitudinal wall at an angle theta (θ) which is in the range of greater or equal to 0 degrees to lower or equal to 90 degrees and wherein the flat top (200) is integrally molded to the elongated base composite (100), (B) injection molding the elongated base composite (100) obtained in step (A) with the at least one thermoplastic composite material to obtain a plurality of reinforcement ribs (105) connected at each end to each of the first longitudinal wall (101) and the second longitudinal wall (102) and dispersed on the bottom (104) in the elongated base composite (100), and (C) pressing the flat top (200) onto the edge (103) of the second longitudinal wall (102) of the elongated base composite (100) of step (B) to obtain a closed structural component (300).

In another aspect, the presently claimed invention is directed to a process for preparing a closed structural component (300) comprising the steps of:

(A') injection molding at least one thermoplastic composite material to obtain an elongated base composite (100) comprising a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), and wherein a flat top (200) is disposed on the edge of the first longitudinal wall (101) of the elongated base composite (100) at an angle theta (θ) which is in the range of greater or equal to 0 degrees to lower or equal to 90 degrees, and (B') pressing the flat top (200) of the elongated base composite (100) of step (A') towards the edge (103) of the second longitudinal wall (102) to obtain a closed structural component (300).

In another aspect, the presently claimed invention is directed to a process for preparing a closed structural component (300), comprising the steps of:

(A') injection molding at least one thermoplastic composite material to obtain an elongated base composite (100) comprising a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), wherein a flat top (200) is disposed on the edge of the first longitudinal wall (101) of the elongated base composite (100) at an angle theta (θ) which is in the range of greater or equal to 0 degrees to lower or equal to 90 degrees and wherein the flat top (200) is integrally molded to the elongated base composite (100), and (B') pressing the flat top (200) of the elongated base composite (100) of step (A') towards the edge (103) of the second longitudinal wall (102) to obtain a closed structural component (300).

In still another aspect, the presently claimed invention is directed to a closed structural component (300) obtainable by the above processes.

In yet another aspect, the presently claimed invention is directed to the use of the above closed structural component (300) in automotive industry as an insert or for home and decorative purposes as an insert in furniture.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It is being understood that various changes may be made in the function and arrangement of elements without departing from the spirit and scope of the invention as set forth in the appended claims. It is also to be understood that the terminology used herein and the figure described herein is not intended to be limiting, since the scope of the presently claimed invention will be limited only by the appended claims.

If hereinafter a group is defined to comprise at least a certain number of embodiments, this is meant to also encompass a group which preferably consists of these embodiments only. Furthermore, the terms "first", "second", "third" or "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the presently claimed invention described herein are capable of operation in other sequences than described or illustrated herein. In case the terms "first", "second", "third" or "(A)", "(B)" and "(C)" or "(a)", "(b)", "(c)", "(d)", "i", "ii" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

Furthermore, the ranges defined throughout the specification include the end values as well, i.e. a range of 1 to 10 implies that both 1 and 10 are included in the range. For the avoidance of doubt, the applicant shall be entitled to any equivalents according to the applicable law.

Reference throughout this specification to "one embodiment" or "an embodiment" means that a particular feature, structure or characteristic described in connection with the embodiment is included in at least one embodiment of the presently claimed invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the presently claimed invention, and form different embodiments, as would be understood by those in the art. For example, in the appended claims, any of the claimed embodiments can be used in any combination.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that the individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof.

Figure 1:
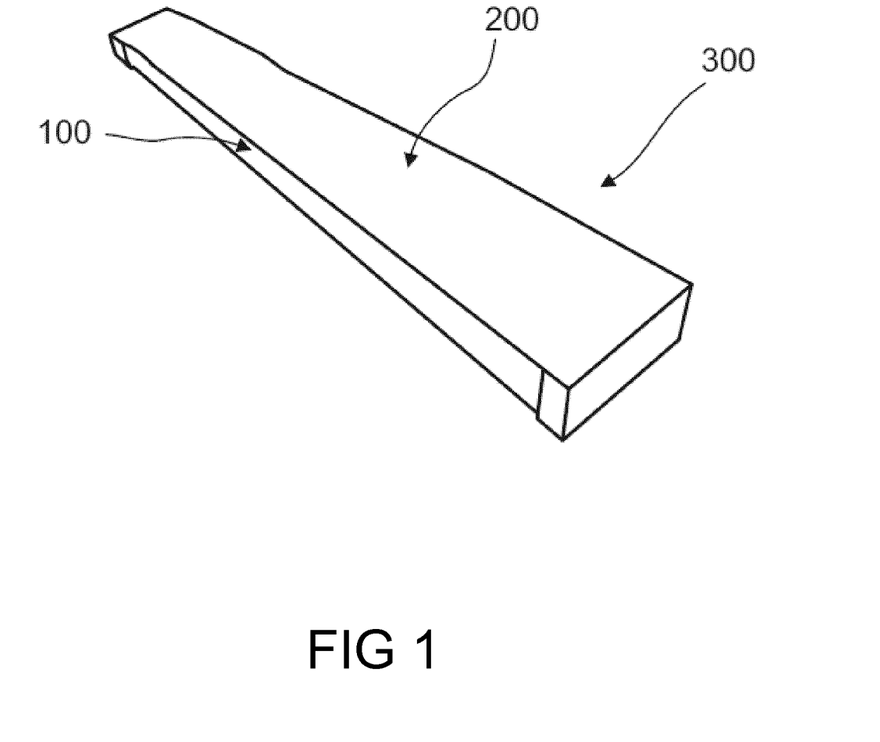
FIG. 1 illustrates a perspective representation of a closed structural component according to the present invention.

An aspect of the presently claimed invention provides for a closed structural component (300). The closed structural composite (300) comprises an elongated base composite (100) and a flat top (200), as shown in FIG. 1. The elongated base composite (100) forms the base, while the flat top (200) closes the said base composite to form a closed structural composite (300).

In an embodiment, the flat top (200) is integrally molded to the elongated base composite (100). The term "integrally molded" means that the flat top (200) and the elongated base composite (100) are part of one whole singularly formed or molded component.

The elongated base composite (100) comprises a first longitudinal wall (101) and a second longitudinal wall (102) each having an edge (103). The first and the second longitudinal walls (101, 102) are placed opposite to one another and disposed on a bottom (104) of the elongated base composite (100). In an embodiment, the first longitudinal wall (101) and the second longitudinal wall (102) are placed at a constant separation. The relative arrangement of the first and second longitudinal walls (101, 102) depends on the desired geometry. Alternatively, they may also be placed at variable separation.

A plurality of reinforcement ribs (105) is connected at each end to each of the first longitudinal wall (101) and the second longitudinal wall (102) and dispersed on the bottom (104) of the elongated base composite (100). The said reinforcement ribs (105) connect the first and the second longitudinal walls (101, 102), thereby forming a reinforcement structure which provides strength to the overall closed structural component (300). In an embodiment, the elongated base composite (100) further comprises a plurality of longitudinal reinforcement ribs (106) dispersed between two or more reinforcement ribs (105). The plurality of longitudinal reinforcement ribs (106) is disposed on the bottom (104) of the elongated base composite (100) and are located at a constant or variable separation from the first and the second longitudinal walls (101, 102). In an embodiment, the plurality of longitudinal reinforcement ribs (106) is disposed on the bottom (104) of the elongated base composite (100) and are located at a constant separation from the first and the second longitudinal walls (101, 102). The plurality of longitudinal reinforcement ribs (106) further support the reinforcement ribs (105) and strengthen the overall closed structural component (300).

While the closed structural component (300) may be obtained in segments, it is preferred that the final closed structural component (300) be of unitary construction made from a durable material.

Accordingly, in one embodiment, the closed structural component (300) comprises of the flat top (200) integrally molded to the first longitudinal wall (101) or the second longitudinal wall (102) of the elongated base composite (100). In other embodiment, the flat top (200) is integrally molded to the first longitudinal wall (101). In another embodiment, the flat top (200) is integrally molded to the second longitudinal wall (102).

Materials that are useful for making the component (300) include, but are not limited to, thermoplastic composite material. Accordingly, the term "composite" as used hereinabove and hereinafter, refers to at least one thermoplastic composite material. Although, other materials can also be used for this purpose, thermoplastic composite materials have been chosen for the present invention due to their enhanced performance characteristic over a wide range of temperature and pressure conditions.

The at least one thermoplastic composite material comprises a plurality of reinforcing fiber bonded together with a thermoplastic material. That is, to say, that the plurality of reinforcing fibers is impregnated on the surface of the thermoplastic material and strongly bond therewith. This results in the overall composite achieving properties better than the material itself. The choice of such reinforcing fiber is based on the physical characteristics desired in the component. However, preferably it comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber. In other embodiment, the reinforcing fiber comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber and inorganic fiber. In another embodiment, the reinforcing fiber comprises one or more of glass fiber, polyester fiber, polyamide fiber, graphite fiber, carbon fiber, ceramic fiber and mineral fiber.

The said thermoplastic material of the at least one thermoplastic composite material comprises one or more of polyolefins, polyamides, polystyrene, acrylonitrylstyrene, butadiene, polyesters, polybutyleneterachlorate, polyvinyl chloride, polyphenylene ether, polyphenylene oxide, polyether imide, polycarbonates, polyestercarbonates, acrylonitrile-butylacrylate-styrene polymers, polybutyleneterephthalate and polyethyleneteraphthalate. Some of the many advantages provided by the thermoplastic material is light weight characteristic, improved mechanical properties such as stiffness, strength and durability, and improved thermal properties.

Preferably, the thermoplastic material comprises one or more of polyolefins, polyamides, polystyrene, acrylonitrylstyrene, butadiene, polyesters, polybutyleneterachlorate, polyvinyl chloride, polyphenylene ether, polyphenylene oxide, polyether imide, polycarbonates, polyestercarbonates and acrylonitrile-butylacrylate-styrene polymers. In other embodiment, it comprises one or more of polyolefins, polyamides, polystyrene, acrylonitrylstyrene, butadiene, polyesters, polybutyleneterachlorate, polyvinyl chloride and polyphenylene ether. In another embodiment, it comprises one or more of polyolefins, polyamides, polystyrene, acrylonitrylstyrene, butadiene and polyesters. In yet another embodiment, the thermoplastic material is a polyamide comprising of nylon-6, nylon-6,6 or mixture thereof. These materials may be obtained commercially such as, but not limited to, Ultramid® from BASF.

Figure 2:
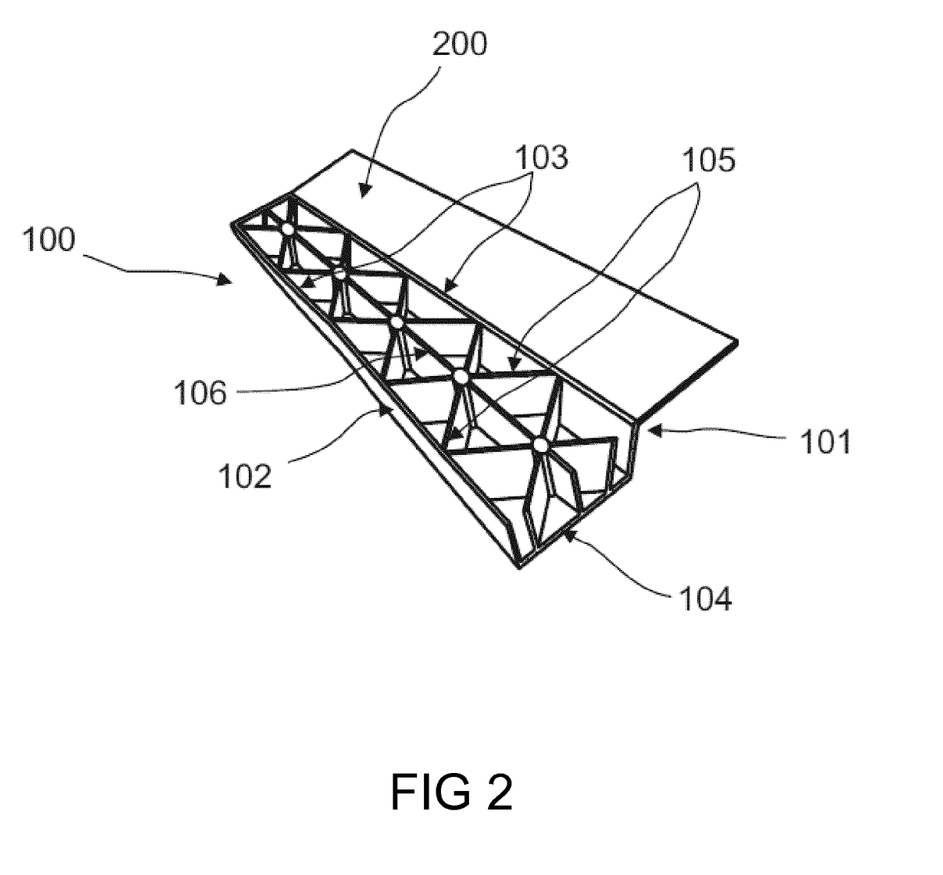
FIG. 2 illustrates a cut open perspective representation of an elongated base composite with flat top in a pan-like shape.
Figure 3:
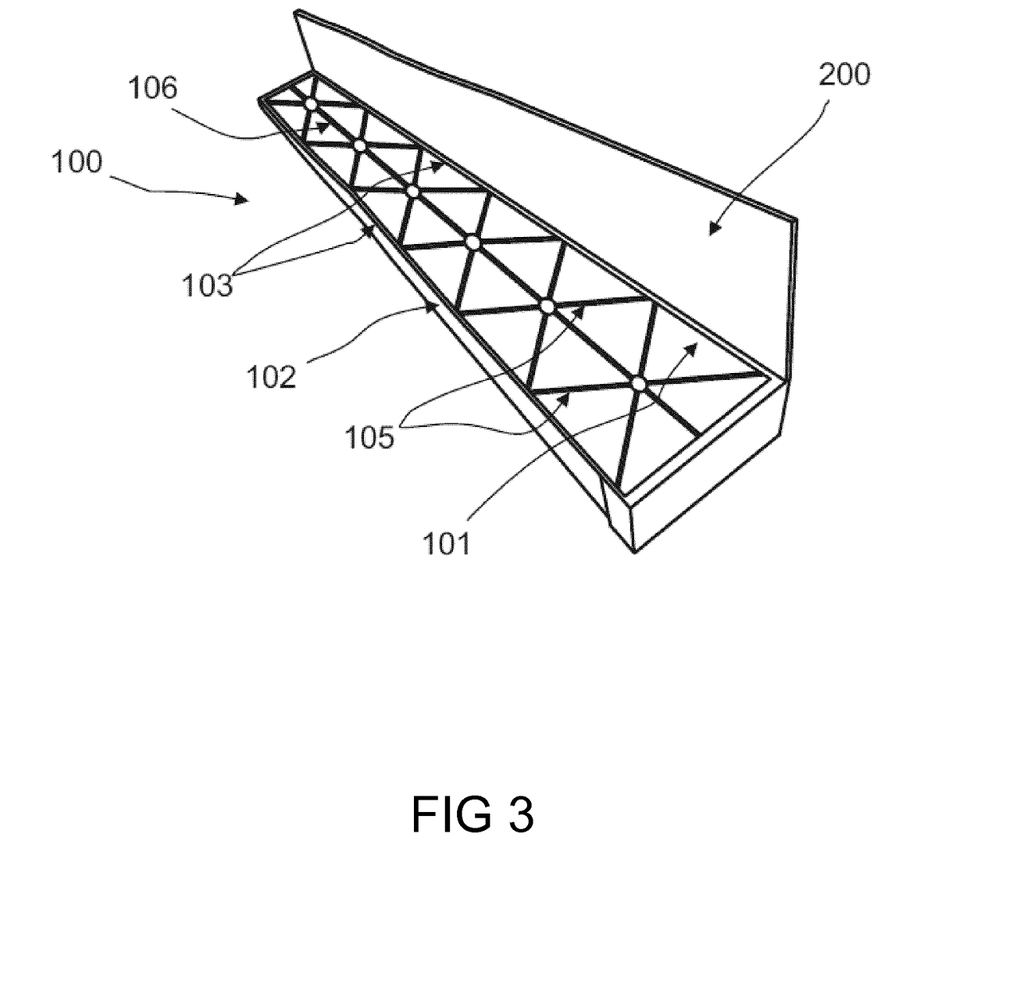
FIG. 3 illustrates a perspective representation of an elongated base composite with flat top in a J-like shape.
Figure 4:
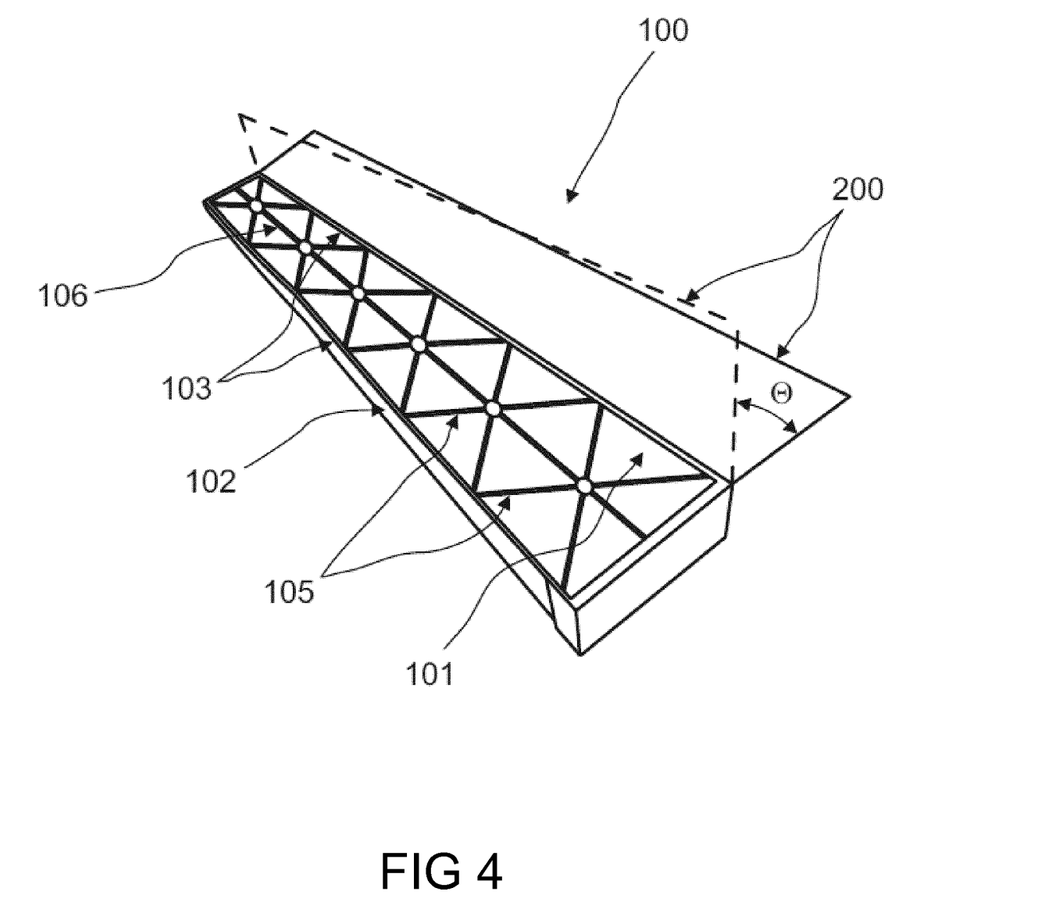
FIG. 4 illustrates a perspective representation of an elongated base composite having showing flat top in both pan-like and J-like shape.

The plurality of reinforcement ribs (105), as described hereinabove, may have any configuration inside the elongated base composite (100). However, the choice of such configuration depends upon the area of application of the closed structural component (300). Typically, the plurality of reinforcement ribs (105) has a X-shaped configuration, ring-shaped configuration, triangular configuration, inverted triangle configuration and other polygonal configuration. Every configuration has a different structural role in the closed structural composite (300). For instance, the plurality of reinforcement ribs (105) having a X-shaped configuration find application in areas of high torsional loading, as shown in FIGS. 2, 3 and 4.

The closed structural component (300) may have any dimension depending upon its application. For instance, it can have a length in the range of greater or equal to 0.1 m to lower or equal to 1.5 m, breadth in the range of greater or equal to 0.01 m to lower or equal to 0.2 m and height in the range of greater or equal to 0.01 m to lower or equal to 0.1 m. By the term "length", it is referred to the dimension in the longitudinal direction. The term "breadth" corresponds to the dimension perpendicular to the longitudinal direction. The term "height" refers to the dimension perpendicular to the plane created by the surface having dimensions of length and breadth i.e. the surface perpendicular to bottom (104) of the elongated base composite (100).

In another aspect of the present invention, a process for preparing the closed structural component (300) is disclosed. The process comprises the steps of:

(A) thermoforming at least one thermoplastic composite material to obtain an elongated base composite (100) comprising a first longitudinal wall (101), a second longitudinal wall (102) and a bottom (104), wherein the first and the second longitudinal walls (101, 102) are placed opposite to one another and disposed on the bottom (104), and wherein a flat top (200) is disposed on the edge (103) of the first longitudinal wall at an angle theta (θ) which is in the range of greater or equal to 0 degrees to lower or equal to 90 degrees, and wherein the flat top (200) is integrally molded to the elongated base composite (100), (B) injection molding the elongated base composite (100) obtained in step (A) with the at least one thermoplastic composite material to obtain a plurality of reinforcement ribs (105) connected at each end to each of the first longitudinal wall (101) and the second longitudinal wall (102) and dispersed on the bottom (104) in the elongated base composite (100), and (C) pressing the flat top (200) onto the edge (103) of the second longitudinal wall (102) of the elongated base composite (100) of step (B) to obtain a closed structural component (300).

The step (A) of the process described hereinabove requires thermoforming of the at least one thermoplastic composite material. In the process of thermoforming, the at least one thermoplastic composite material is heated to a temperature in the range of greater or equal to Tm to lower or equal to Tm+30° C., wherein Tm is the melt temperature of the at least one thermoplastic composite material determined according to ISO 3146:2000. This is achieved by techniques such as, but not limited to, infrared heater, contact heater and hot air heater. The at least one thermoplastic composite material upon heating is molded to a desired geometry. The choice of such a geometry depends on the application of the closed structural component (300). A person skilled in the art is well aware of different heating techniques and geometries that can be used to form the desired closed structural component (300).

In an embodiment, a mold is selected such that the resulting elongated base composite (100) comprises the first longitudinal wall (101), the second longitudinal wall (102) and the bottom (104), wherein the first and the second longitudinal walls (101, 102) are placed opposite to one another and disposed on the bottom (104), and wherein the flat top (200) is disposed on the edge (103) of the first longitudinal wall at an angle theta (θ) which is in the range of greater or equal to 0 degrees to lower or equal to 90 degrees. The flat top (200) disposed on the edge (103) of the first longitudinal wall (101) of the elongated base composite (100) forms an extended first longitudinal wall. The flat top (200) subtends an angle θ from the horizontal, such that θ is in the range of greater or equal to 0 degrees to lower or equal to 90 degrees. By the term "horizontal", it is referred to the plane surface parallel to the bottom (104) of the elongated base composite (100) or the bottom (104) itself.

Referring to FIG. 4, when θ is equal to 0 degrees, the flat top (200) forming the extended first longitudinal wall is parallel to the bottom (104) to resemble a pan-like shape, as shown by continuous lines in the elongated base composite (100). In another embodiment when θ is equal to 90 degrees, the flat top (200) forming the extended first longitudinal wall is perpendicular to the bottom (104) to resemble a J-like shape, as depicted by the dotted lines in the elongated base composite (100).

Once the elongated base composite (100) is obtained, as described hereinabove, it is subjected to injection molding process, as described in step (B). Injection molding technique is well known to a person skilled in the art and accordingly the choice of different molds for the said process along with the typical process conditions can be made depending upon the desired geometry of the final closed structural component to be obtained. This technique is the most common method for producing articles or parts made of plastic, for e.g. the at least one thermoplastic composite material, as described hereinabove. The process includes the injection or forcing of heated molten plastic into a mold which is in the form of the part to be made. Upon cooling and solidification, the part is ejected and the process continues. The injection molding process can produce an infinite variety of part designs containing an equally infinite variety of details such as threads, springs, and hinges and all in a single molding operation.

The injection system mechanism may be of the reciprocating screw type or, less frequently, the two-stage screw type. Also included is a hopper, a heated injection barrel encasing the screw, a hydraulic motor, and an injection cylinder. The system's function is to heat the plastic to the proper viscosity and inject it into the mold. As the plastic enters the injection barrel, it is moved forward by the rotation of the screw. As this movement occurs, the plastic is melted by frictional heat and supplementary heating of the barrel encasing the screw. The screw has three distinct zones which further processes the plastic prior to actual injection.

Injection is achieved through an arrangement of valves and a nozzle, all acted upon by the screw and the hydraulic pump that pushes the plastic into the mold. Typically, the pressure during injection molding is in the range of greater or equal to 130 MPa to lower or equal to 210 MPa. Similarly, the temperature conditions are in the range of greater or equal to 200° C. to lower or equal to 400° C.

The mold determines the part's shape, acts as a heat sink to cool the part, is made to vent trapped air and gases, and, finally, ejects the finished part. Molds are most often made of special molding steel. Other mold materials include beryllium copper, stainless steel, aluminum, brass and kirksite. Molds are manufactured by machining, EDM or casting. The finished mold surfaces are often polished and coated to resist wear and aid in part ejection.

For the purpose of the present invention, injection molding of the elongated base composite (100) is done with the at least one thermoplastic composite material to obtain a plurality of reinforcement ribs (105) connected at each end to each of the first longitudinal wall (101) and the second longitudinal wall (102) and dispersed on the bottom (104) in the elongated base composite (100). Accordingly, when the at least one thermoplastic composite material is injected in the machine, the resulting product obtained thereby is an elongated base composite (100) comprising the features described hereinabove.

The elongated base composite (100) obtained in step (B) of the process, as described hereinabove, is further subjected to pressing in step (C). By the term "pressing", it is referred to subjecting the elongated base composite (100) to conditions of pressure and temperature to obtain the closed structural component (300). During pressing, the flat top (200), which is disposed on the edge (103) of the first longitudinal wall at an angle theta (θ) which is in the range of greater or equal to 0 degrees to lower or equal to 90 degrees, is pressed onto the edge (103) of the second longitudinal wall (102) of the elongated base composite (100) of step (B) to obtain a closed structural component (300). The typical process conditions for pressing is well known to a person skilled in the art. However, for the purpose of the present invention, a temperature in the vicinity of the melting temperature of the at least one thermoplastic composite material is maintained.

The pressing leads to the at least one thermoplastic composite material getting adhered onto the elongated base composite (100). In doing so, the adhesive properties of the at least one thermoplastic composite material provides for the further enhancement in the physical characteristics of the closed structural component (300) obtained thereafter.

The elongated base composite (100) obtained in step (A) has an edge (103) on each of the first and the second longitudinal walls (101, 102), as shown in the figures. The flat top (200) can be thermoformed on one of the said edge (103) on any one of the first or second longitudinal wall (101, 102). Once the elongated base composite (100) is obtained in step (A) along with the flat top (200) disposed on the edge (103) of any one of the first or second longitudinal wall (101, 102), it forms a flap-like structure which is then pressed onto the edge (103) of the remaining first or second longitudinal wall (101, 102) in step (C). In this manner, the flat top (200) closes the elongated base composite (100) on the top, thereby forming a closed structural component (300). In an embodiment, the flat top (200) is disposed on the edge (103) of the first longitudinal wall (101), as shown in FIGS. 2 & 3. Alternatively, the flat top (200) can be disposed onto the edge (103) of the second longitudinal wall (102) and then pressed towards the edge (103) of the first longitudinal wall (101) after injection molding the elongated base composite (100) with the plurality of reinforcement ribs (105).

During the pressing step i.e. step (C), a temperature in the range of greater or equal to Tm to lower or equal to Tm+30° C. is provided, wherein Tm is the melt temperature of the at least one thermoplastic composite material determined according to ISO 3146:2000. When the temperature is maintained near the melt temperature Tm or is lower than Tm+30° C., the edge (103) of the remaining first or second longitudinal wall (101, 102) of the elongated base composite (100) is adhered with the flat top (200) to form a closed structural component (300).

In an embodiment, the elongated base composite (100) obtained in step (B) further comprises a plurality of longitudinal reinforcement ribs (106) dispersed between two or more reinforcement ribs (105). The plurality of longitudinal reinforcement ribs (106) is disposed on the bottom (104) of the elongated base composite (100), as described hereinabove.

In another embodiment, the flat top (200) is integrally molded to the first longitudinal wall (101) or the second longitudinal wall (102) of the elongated base composite. Said otherwise, no adhesive or fastening means is present between the flat top (200) and the elongated top composite (100). The absence of any adhesive or fastening means results in complete reinforcement of the closed structural component (300) due to availability of additional structural area. The term "complete reinforcement" here refers to the closed structural component (300) having continuous fibers of the reinforcing fibers on the additional structural area. That is, to say, that the continuous fibers are dispersed on the edges (103) of the first and second longitudinal wall (101, 102), which form the additional area. On the contrary, the presence of adhesive or fastening means would have no fibers in these areas. This benefits the component (300) by enhancing the load bearing capacity and therefore, the present component (300) does not results in any loss in its load bearing capability.

In another aspect, the closed structural component (300) can be obtained by a process comprising the steps of:

(A') injection molding at least one thermoplastic composite material to obtain an elongated base composite (100) comprising a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), and wherein a flat top (200) is disposed on the edge of the first longitudinal wall (101) of the elongated base composite (100) at an angle theta (θ) which is in the range of greater or equal to 0 degrees to lower or equal to 90 degrees and wherein the flat top (200) is integrally molded to the elongated base composite (100), and (B') pressing the flat top (200) of the elongated base composite (100) of step (A') towards the edge (103) of the second longitudinal wall (102) to obtain a closed structural component (300).

In the above described process, the at least one thermoplastic composite is injection molded in a mold to directly obtain an elongated base composite (100) without performing the step of thermoforming. The elongated base composite (100) comprises a first longitudinal wall (101) and a second longitudinal wall (102) each having an edge (103). The first and the second longitudinal walls (101, 102) are placed opposite to one another and disposed on a bottom (104). A plurality of reinforcement ribs (105) connected at each end to each of the first longitudinal wall (101) and the second longitudinal wall (102) and dispersed on the bottom (104). A flat top (200) is disposed on the edge of the first longitudinal wall (101) of the elongated base composite (100) at an angle theta (θ) which is in the range of greater or equal to 0 degrees to lower or equal to 90 degrees.

The flat top (200) when disposed on the edge (103) of the first longitudinal wall (101) of the elongated base composite (100), forms an extended first longitudinal wall. The flat top (200) subtends an angle θ from the horizontal, such that θ is in the range of greater or equal to 0 degrees to lower or equal to 90 degrees. Referring to FIG. 4, when θ is equal to 0 degrees, the flat top (200) forming the extended first longitudinal wall is parallel to the bottom (104) to resemble a pan-like shape, as shown in FIG. 2 and as depicted by the continuous lines in FIG. 4.

In another embodiment when θ is equal to 90 degrees, the flat top (200) forming the extended first longitudinal wall is perpendicular to the bottom (104) to resemble a J-like shape, as shown in FIG. 3 and as depicted by the dotted lines in FIG. 4.

The elongated base composite (100), as described hereinabove, is obtained as a single component in the injection molding process in step (A'). The flat top (200), represented by either the continuous lines or the dotted lines in FIG. 4, is then pressed in step (B') by means of mechanical press or manually by hand towards the edge (103) of the second longitudinal wall (102) to form a flat top (200) disposed on the edge (103) of each of the first and the second longitudinal walls (101, 102), thereby obtaining a closed structural component (300).

During the pressing step i.e. step (B'), a temperature in the range of greater or equal to Tm to lower or equal to Tm+30° C. is provided, wherein Tm is the melt temperature of the at least one thermoplastic composite material determined according to ISO 3146:2000. When the temperature is maintained near the melt temperature Tm or is lower than Tm+30° C., the edge (103) of the remaining first or second longitudinal wall (101, 102) of the elongated base composite (100) is adhered with the flat top (200) to form a closed structural component (300).

In an embodiment, the elongated base composite (100) obtained in step (B') further comprises a plurality of longitudinal reinforcement ribs (106) dispersed between two or more reinforcement ribs (105). The plurality of longitudinal reinforcement ribs (106) is disposed on the bottom (104) of the elongated base composite (100), as described hereinabove.

Alternatively, the flat top (200) can also be disposed on the edge (103) of the second longitudinal wall (102) of the elongated base composite (100) at an angle theta (θ) which is in the range of greater or equal to 0 degrees to lower or equal to 90 degrees. Accordingly, the flat top (200) can also be disposed on the edge (103) of the second longitudinal wall (102) subtending an angle θ from the horizontal to form a pan-like shape or a J-like shape. In fact, the flat top (200) can be disposed on the edge (103) of any of the first or second longitudinal wall (101, 102) at an angle θ having any value in the range of greater or equal to 0 degrees to lower or equal to 90 degrees, represented by either the continuous lines or the dotted lines in FIG. 4. Such a modification is well known to a person skilled in the art and can be achieved by using different shapes of molds in the injection molding process.

In another embodiment, the flat top (200) is integrally molded to the first longitudinal wall (101) or the second longitudinal wall (102) of the elongated base composite and there is no adhesive or fastening means present therebetween.

In a further aspect of the present invention, use of the closed structural component (300), as described hereinabove, or as obtained according to any of the processes, also described hereinabove, in automotive industry as an insert or for home and decorative purposes as an insert in furniture is disclosed.

The closed structural component (300) of the present invention finds wide application as an insert in vehicles in a body in white, seats and in furniture. Owing to its raw material for manufacturing i.e. the at least one thermoplastic composite material, the component (300) is light in weight. In comparison to the conventional open inserts used for the same application, the closed structural component (300) has better and improved mechanical properties owing to which it is capable of withstanding buckling due to high load and stress, is capable of withstanding or deflecting the torsion, bending and crushing due to sudden impact or increase in load. Additionally, the absence of any adhesive or fastening means between the flat top (200) and the elongated base composite (100), as described hereinabove, provides complete reinforcement to the component without any loss in the structural area and thereby recovers the load bearing capability of the component. In fact, it has been observed that the present invention closed structural component (300) could take up 250% increased peak load in comparison to the open conventional structural component as depicted by the force-displacement curves for a 3-point bend test using computer aided engineering (CAE).

For the specific application of the closed structural component (300) in automotive industry as inserts, the said component (300) can be used in vehicles in the dashboard crossbeam, inner shell for hood, bumper stiffener at front, structural front end, car floors, seats, structural battery casings, A-,B-,C-pillar reinforcement, structural inner shell for trunk lid/tail gate, bumper stiffener at rear, structural rear tray, roof crossbeams and structural support for door module.

In the following there is provided a list of embodiments to further illustrate the present disclosure without intending to limit the disclosure to the specific embodiments listed below:

1. A closed structural component (300) comprising:
    an elongated base composite (100) comprising
        a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), and
        a flat top (200) disposed on the edge (103) of each of the first and the second longitudinal walls (101, 102) of the elongated base composite (100).
2. The closed structural component according to embodiment 1, characterized in that the elongated base composite (100) further comprises a plurality of longitudinal reinforcement ribs (106) dispersed between two or more reinforcement ribs (105).
3. The closed structural component according to embodiment 2, characterized in that the plurality of longitudinal reinforcement ribs (106) is disposed on the bottom.
4. The closed structural component according to one or more of embodiments 1 to 3, characterized in that the elongated base composite (100) and the flat top (200) comprise of, in-dependent of one another, at least one thermoplastic composite material.
5. The closed structural component according to embodiment 4, characterized in that the at least one thermoplastic composite material comprises a plurality of reinforcing fiber bonded together with a thermoplastic material.
6. The closed structural component according to embodiment 5, characterized in that the reinforcing fiber comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber.
7. The closed structural component according to embodiment 5 or 6, characterized in that thermoplastic material comprises one or more of polyolefins, polyamides, polystyrene, acrylonitrylstyrene, butadiene, polyesters, polybutyleneterachlorate, polyvinyl chloride, polyphenylene ether, polyphenylene oxide, polyether imide, polycarbonates, polyestercarbonates, acrylonitrile-butylacrylate-styrene polymers, polybutyleneterephthalate and polyethyleneteraphthalate.
8. The closed structural component according to embodiment 7, characterized in that the polyamide comprises of nylon-6, nylon-6,6 or a mixture thereof.
9. The closed structural component according to one or more of embodiments 1 to 8, characterized in that the plurality of reinforcement ribs (105) has a X-shaped configuration, ring-shaped configuration, triangular configuration, inverted triangle configuration and other polygonal configuration.
10. A process for preparing a closed structural component (300), comprising the steps of:
    (A) thermoforming at least one thermoplastic composite material to obtain an elongated base composite (100) comprising a first longitudinal wall (101), a second longitudinal wall (102) and a bottom (104), wherein the first and the second longitudinal walls (101, 102) are placed opposite to one another and disposed on the bottom (104), and wherein a flat top (200) is disposed on the edge (103) of the first longitudinal wall at an angle theta (θ) which is in the range of greater or equal to 0 degrees to lower or equal to 90 degrees,
    (B) injection molding the elongated base composite (100) obtained in step (A) with the at least one thermoplastic composite material to obtain a plurality of reinforcement ribs (105) connected at each end to each of the first longitudinal wall (101) and the second longitudinal wall (102) and dispersed on the bottom (104) in the elongated base composite (100),
    (C) pressing the flat top (200) onto the edge (103) of the second longitudinal wall (102) of the elongated base composite (100) of step (B) to obtain a closed structural component (300).
11. The process according to embodiment 10, characterized in that in step (B) a temperature in the range of greater or equal to 200° C. to lower or equal to 400° C. is provided.
12. The process according to embodiment 10 or 11, characterized in that in step (A) and step (C), independently of one another, a temperature in the range of greater or equal to Tm to lower or equal to Tm+30° C. is provided, wherein Tm is the melt temperature of the at least one thermoplastic composite material determined according to ISO 3146:2000.
13. A process for preparing a closed structural component (300), comprising the steps of:
    (A') injection molding at least one thermoplastic composite material to obtain an elongated base composite (100) comprising
        a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), and
        wherein a flat top (200) is disposed on the edge of the first longitudinal wall (101) of the elongated base composite (100) at an angle theta (θ) which is in the range of greater or equal to 0 degrees to lower or equal to 90 degrees, and
    (B') pressing the flat top (200) of the elongated base composite (100) of step (A') towards the edge (103) of the second longitudinal wall (102) to obtain a closed structural component (300).

14. The process according to embodiment 13, characterized in that in step (A') a temperature in the range of greater or equal to 200° C. to lower or equal to 400° C. is provided.
15. Use of the closed structural component (300) according to one or more of embodiments 1 to 9 or obtained according to one or more of embodiments 10 to 12 or obtained according to one or more of embodiments 13 to 14 in automotive industry as an insert or for home and decorative purposes as an insert in furniture.
16. A closed structural component (300) comprising:
    an elongated base composite (100) comprising
        a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), and
        a flat top (200) disposed on the edge (103) of each of the first and the second longitudinal walls (101, 102) of the elongated base composite (100), wherein the flat top (200) is integrally molded to the elongated base composite (100).
17. The closed structural component according to embodiment 16, characterized in that the elongated base composite (100) further comprises a plurality of longitudinal reinforcement ribs (106) dispersed between two or more reinforcement ribs (105).
18. The closed structural component according to embodiment 17, characterized in that the plurality of longitudinal reinforcement ribs (106) is disposed on the bottom.
19. The closed structural component according to one or more of embodiments 16 to 18, characterized in that the elongated base composite (100) and the flat top (200) comprise of, independent of one another, at least one thermoplastic composite material.
20. The closed structural component according to embodiment 19, characterized in that the at least one thermoplastic composite material comprises a plurality of reinforcing fiber bonded together with a thermoplastic material.
21. The closed structural component according to embodiment 20, characterized in that the reinforcing fiber comprises one or more of metal fiber, metalized inorganic fiber, metalized synthetic fiber, glass fiber, polyester fiber, polyamide fiber, graphite fiber, carbon fiber, ceramic fiber, mineral fiber, basalt fiber, inorganic fiber, aramid fiber, kenaf fiber, jute fiber, flax fiber, hemp fiber, cellulosic fiber, sisal fiber and coir fiber.
22. The closed structural component according to embodiment 20 or 21, characterized in that thermoplastic material comprises one or more of polyolefins, polyamides, polystyrene, acrylonitrylstyrene, butadiene, polyesters, polybutyleneterachlorate, polyvinyl chloride, polyphenylene ether, polyphenylene oxide, polyether imide, polycarbonates, polyestercarbonates, acrylonitrile-butylacrylate-styrene polymers, polybutyleneterephthalate and polyethyleneteraphthalate.
23. The closed structural component according to embodiment 22, characterized in that the polyamide comprises of nylon-6, nylon-6,6 or a mixture thereof.
24. The closed structural component according to one or more of embodiments 16 to 23, characterized in that the plurality of reinforcement ribs (105) has a X-shaped configuration, ring-shaped configuration, triangular configuration, inverted triangle configuration and other polygonal configuration.
25. The closed structural component according to one or more of embodiments 16 to 24, characterized in that the flat top (200) is integrally molded to the first longitudinal wall (101) or the second longitudinal wall (102) of the elongated base composite (100).
26. A process for preparing a closed structural component (300), comprising the steps of:
    (A) thermoforming at least one thermoplastic composite material to obtain an elongated base composite (100) comprising a first longitudinal wall (101), a second longitudinal wall (102) and a bottom (104), wherein the first and the second longitudinal walls (101, 102) are placed opposite to one another and disposed on the bottom (104),
        wherein a flat top (200) is disposed on the edge (103) of the first longitudinal wall at an angle theta (θ) which is in the range of greater or equal to 0 degrees to lower or equal to 90 degrees, and wherein the flat top (200) is integrally molded to the elongated base composite (100),
    (B) injection molding the elongated base composite (100) obtained in step (A) with the at least one thermoplastic composite material to obtain a plurality of reinforcement ribs (105) connected at each end to each of the first longitudinal wall (101) and the second longitudinal wall (102) and dispersed on the bottom (104) in the elongated base composite (100), and
    (C) pressing the flat top (200) onto the edge (103) of the second longitudinal wall (102) of the elongated base composite (100) of step (B) to obtain a closed structural component (300).
27. The process according to embodiment 26, characterized in that in step (B) a temperature in the range of greater or equal to 200° C. to lower or equal to 400° C. is provided.
28. The process according to embodiment 26 or 27, characterized in that in step (A) and step (C), independently of one another, a temperature in the range of greater or equal to Tm to lower or equal to $T_m$+30° C. is provided, wherein $T_m$ is the melt temperature of the at least one thermoplastic composite material determined according to ISO 3146: 2000.
29. The process according to one or more of embodiments 26 to 28, characterized in that the flat top (200) is integrally molded to the first longitudinal wall (101) or the second longitudinal wall (102) of the elongated base composite (100).
30. The process according to one or more of embodiments 26 to 29, characterized in that no adhesive or fastening means is present between the flat top (200) and the elongated base composite (100).
31. A process for preparing a closed structural component (300), comprising the steps of:
    (A') injection molding at least one thermoplastic composite material to obtain an elongated base composite (100) comprising
        a first longitudinal wall (101) and a second longitudinal wall (102) each having an edge (103), wherein the first and the second longitudinal walls (101, 102) are placed opposite to one another and disposed on a bottom (104), a plurality of reinforcement ribs (105) connected at each end to each of the first longitudinal wall (101) and the second longitudinal wall (102) and dispersed on the bottom (104), wherein a flat top (200) is disposed on the edge of the first longitudinal wall (101) of the elongated base composite (100) at an angle theta (θ) which is in the range of greater or equal to 0 degrees to lower or equal to 90 degrees and wherein the flat top (200) is integrally molded to the elongated base composite (100), and (B') pressing the flat top (200) of the elongated base composite (100) of step (A') towards the edge (103) of the second longitudinal wall (102) to obtain a closed structural component (300).

32. The process according to embodiment 31, characterized in that in step (A') a temperature in the range of greater or equal to 200° C. to lower or equal to 400° C. is provided.

33. The process according to embodiment 31 or 32, characterized in that the flat top (200) is integrally molded to the first longitudinal wall (101) or the second longitudinal wall (102) of the elongated base composite (100).

34. The process according to one or more of embodiments 31 to 33, characterized in that no adhesive or fastening means is present between the flat top (200) and the elongated base composite (100).

35. A closed structural component (300) obtainable by the process according to one or more of embodiments 16 to 30 or 31 to 34.

36. Use of the closed structural component (300) according to one or more of embodiments 16 to 25 or obtained by the process according to one or more of embodiments 16 to 30 or 31 to 34 in automotive industry as an insert or for home and decorative purposes as an insert in furniture.

The invention claimed is:

1. A closed structural component comprising an elongated base composite comprising:
    a first longitudinal wall and a second longitudinal wall each having an edge, wherein the first longitudinal wall and the second longitudinal wall are disposed opposite to one another and disposed on a bottom;
    a plurality of reinforcement ribs connected at each end to each of the first longitudinal wall and the second longitudinal wall and dispersed on the bottom; and
    a flat top disposed on the edge of each of the first longitudinal wall and the second longitudinal wall, wherein the flat top is integrally molded to the elongated base composite.

2. The closed structural component of claim 1, wherein the elongated base composite further comprises a plurality of longitudinal reinforcement ribs dispersed between two or more reinforcement ribs.

3. The closed structural component of according of claim 2, wherein the plurality of longitudinal reinforcement ribs is disposed on the bottom.

4. The closed structural component of claim 1, wherein the flat top is integrally molded to the first longitudinal wall or the second longitudinal wall.

* * * * *